(12) United States Patent
Turney et al.

(10) Patent No.: US 6,684,235 B1
(45) Date of Patent: Jan. 27, 2004

(54) ONE-DIMENSIONAL WAVELET SYSTEM AND METHOD

(75) Inventors: Robert D. Turney, Watertown, WI (US); Ali M. Reza, Milwaukee, WI (US)

(73) Assignee: Xilinx, Inc., San Jose, CA (US)

( * ) Notice: Subject to any disclaimer, the term of this patent is extended or adjusted under 35 U.S.C. 154(b) by 536 days.

(21) Appl. No.: 09/724,662

(22) Filed: Nov. 28, 2000

(51) Int. Cl.[7] .............................................. G06F 17/14
(52) U.S. Cl. ..................................................... 708/400
(58) Field of Search ........................... 708/400; 382/276

(56) References Cited

U.S. PATENT DOCUMENTS

| | | | |
|---|---|---|---|
| 4,760,543 A | 7/1988 | Lightenberg et al. | |
| 4,791,598 A | 12/1988 | Liou et al. | |
| 5,126,962 A | 6/1992 | Chiang | |
| 5,197,021 A | 3/1993 | Cucchi et al. | |
| 5,859,788 A | 1/1999 | Hou | |
| 5,875,122 A | 2/1999 | Acharya | |
| 5,889,413 A | 3/1999 | Bauer | |
| 5,991,788 A | 11/1999 | Mintzer | |
| 5,995,210 A | * 11/1999 | Acharya | ...................... 356/73 |
| 6,038,579 A | 3/2000 | Sekine | |
| 6,047,303 A | 4/2000 | Acharya | |
| 6,118,902 A | * 9/2000 | Knowles | ...................... 382/240 |
| 6,178,269 B1 | * 1/2001 | Acharya | ...................... 382/277 |
| 6,216,145 B1 | 4/2001 | Zandi et al. | |
| 6,223,195 B1 | 4/2001 | Tonomura | |
| 6,499,045 B1 | * 12/2002 | Turney et al. | ............... 708/401 |
| 6,587,589 B1 | * 7/2003 | Chen et al. | .................. 382/240 |

* cited by examiner

*Primary Examiner*—David H. Malzahn
(74) *Attorney, Agent, or Firm*—LeRoy D. Maunu; Lois D. Cartier

(57) ABSTRACT

A one-dimensional wavelet system and method. In various embodiments, computation engines are set forth for forward and inverse transforms in a wavelet system. The computation engine includes a plurality of register banks having input ports arranged to receive input sample values and a multiplexer coupled to the output ports of the register banks. A processing unit is configured to perform the forward or inverse wavelet transform for data values that are sequenced through the register banks and multiplexer by a control unit. The computation unit is adaptable to implement discrete wavelet transform, discrete wavelet packet, and custom wavelet trees.

24 Claims, 8 Drawing Sheets

ONE-DIMENSIONAL WAVELET SYSTEM AND METHOD

FIELD OF THE INVENTION

The present invention generally relates to wavelet systems, and more particularly to one-dimensional wavelet transform systems.

BACKGROUND

An example programmable logic device (PLD) is the field programmable gate array (FPGA), first introduced by Xilinx, Inc., in 1985. PLDs such as FPGAs are becoming increasingly popular for use in electronics systems. For example, communications systems employ FPGAs in large measure for their re-programmability. In general, the use of FPGAs continues to grow at a rapid rate because they permit relatively short design cycles, reduce costs through logic consolidation, and offer flexibility in their re-programmability.

Advances in semiconductor process technology are delivering FPGAs having logic densities in the range of a million system gates and having operating speeds in excess of 100 MHz. These powerful devices are capable of and have been used to implement digital signal processing (DSP) algorithms which are inherently parallel and normally require multiple DSP microprocessors in order to meet the high data rates. It is feasible to implement such algorithms on a single FPGA because such devices offer a programmable architecture.

The discrete wavelet transform (DWT) is a useful and efficient signal and image decomposition method with many interesting properties. This transformation, which is similar to the Fourier transform, provides information about the frequency content of signals. However, unlike the Fourier transform, DWT is more natural and fruitful when applied to non-stationary signals, such as speech and images.

The flexibility offered by DWT allows researchers to develop suitable wavelet filters for particular applications. For example, in the compression of fingerprints a particular set of biorthogonal filters, Daubechies biorthogonal spline wavelet filters, has been found to be effective. This flexibility is nonexistent in the discrete-cosine transform for image compression.

The latest standards for image and video compression, JPEG and MPEG, include wavelet transforms as the means for image and video signal decomposition. In addition to efficient image decomposition for compression and coding, wavelet transform is applied to images for filtering and enhancement. The filtering algorithms, generally referred to as denoising, have shown robust and effective performance in the removal of noise from images with minimal side effects (blurring).

In many image processing applications, including compression, denoising, and enhancement, real-time processing of a two-dimensional wavelet transform is required. Flexibility in customizing the wavelet transform with regard to the filters and the structure of the wavelet decomposition tree are also desirable. Most ASIC implementations are developed for specific wavelet filters and/or wavelet decomposition trees, which renders ASIC solutions useless for applications that require different filters and/or different decomposition trees. A system and method that address the aforementioned problems, as well as other related problems, are therefore desirable.

SUMMARY OF THE INVENTION

In various embodiments, a computation engine is provided for one-dimensional wavelet systems. The computation unit is adaptable to implement discrete wavelet transform, discrete wavelet packet, and custom wavelet trees.

The computation engine includes a plurality of register banks having input ports arranged to receive input sample values and a multiplexer coupled to the output ports of the register banks. A processing unit is configured to perform the forward or inverse wavelet transform for data values that are sequenced through the register banks and multiplexer by a control unit. Depending on the structure of the wavelet tree, the computation engine can implement multiple stages of the wavelet transform and/or multiple filter elements of the transform. All or part of the computation engine can be implemented on a programmable logic device, for example, a field programmable gate array, to provide further design flexibility.

It will be appreciated that various other embodiments are set forth in the Detailed Description and Claims, which follow.

BRIEF DESCRIPTION OF THE DRAWINGS

Various aspects and advantages of the invention will become apparent upon review of the following detailed description and upon reference to the drawings, in which.

DETAILED DESCRIPTION

For many wavelet systems, a single stage is insufficient. Thus, a wavelet tree structure including multiple instances of a single stage wavelet structure is usually employed. The interconnection of the single stage wavelet structures in a multi-stage implementation gives rise to three fundamental structures: the Discrete Wavelet Transform (DWT), the Discrete Wavelet Packet (DWP), and the Custom Wavelet Tree (CWT). The DWT, DWP, and CWT have different applications as known in the art.

Figure 1A:
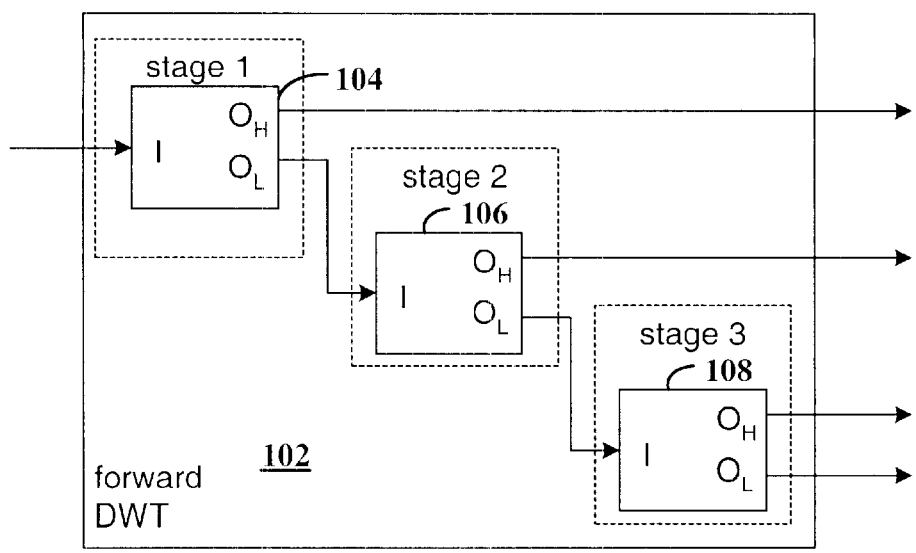
FIG. 1A is a block diagram of a three-stage forward discrete wavelet transform (DWT) arrangement.
Figure 1B:
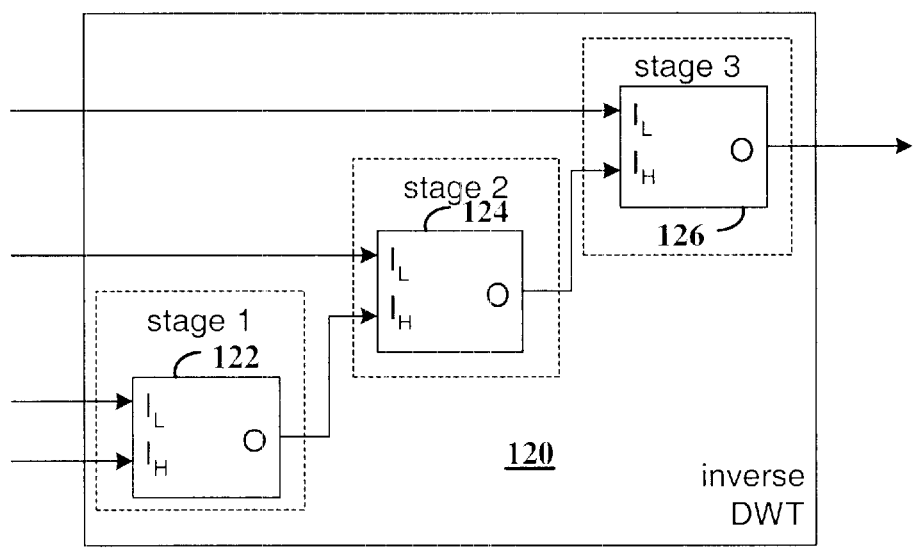
FIG. 1B is a block diagram of a three-stage inverse DWT arrangement.

FIG. 1A is a block diagram of a three-stage forward DWT arrangement, and FIG. 1B is a block diagram of a three-stage inverse DWT arrangement. The DWT terminology refers to a wavelet transform that has a tree structure where the low pass components are passed and split in each level of the tree while the high pass components are provided as output data. This results in a logarithmic division of the frequency domain. For n levels of a forward DWT, the output data stream includes every other output from stage 1, every fourth output from stage 2, every eighth output from stage 3, . . . , and every $2^n$ output from stage n. This same data format is used as input to the Inverse DWT operation.

Forward DWT arrangement 102 includes elements 104, 106, and 108. Each of elements 104, 106, and 108 include low-pass and high-pass filters (not shown), and the output data from the filters are decimated by two. The low output data from element 104 is input to element 106, and the low output data from element 106 is input to element 108.

Inverse DWT arrangement 120 includes elements 122, 124, and 126. Each of elements 122, 124, and 126 interpolate the input data by two and include synthesis low-pass and high-pass filters (not shown). The output data from the low-pass and high-pass filters is summed and provided on the output port.

Figure 2:
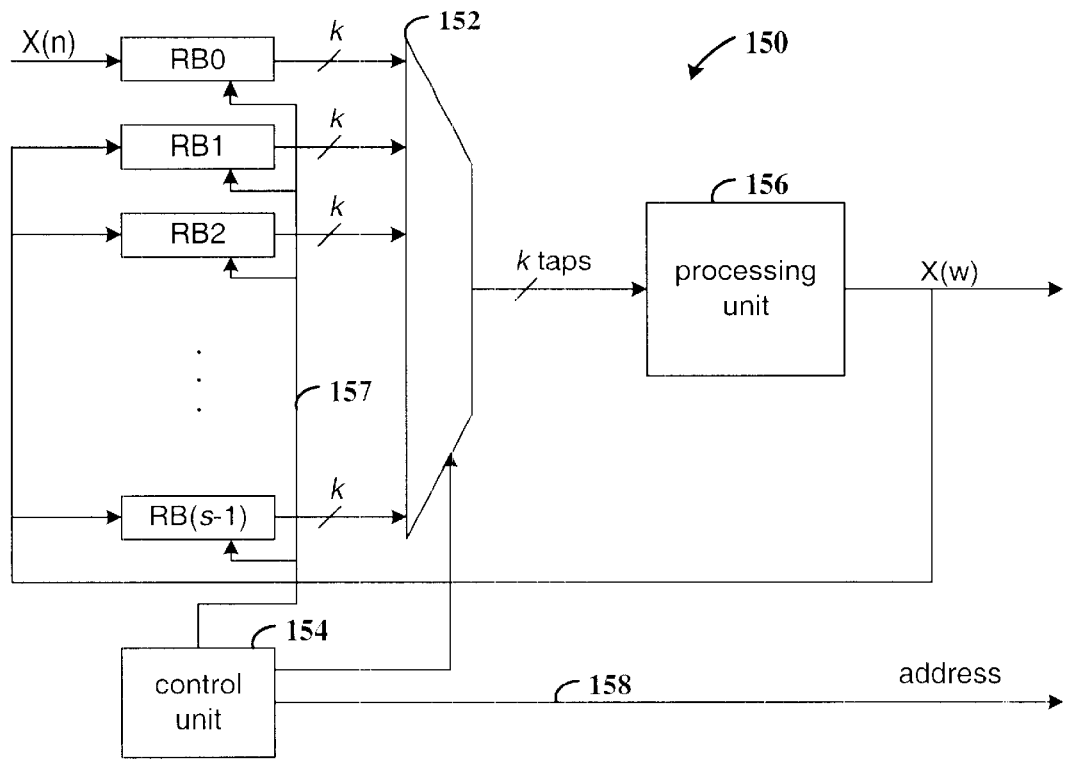
FIG. 2 is a functional block diagram of a circuit arrangement for implementing a forward DWT.

FIG. 2 is a functional block diagram of a circuit arrangement for implementing forward DWT 102. Since the forward DWT exhibits a logarithmic division of the frequency domain, the output data stream can be represented for an n-level DWT in which every other output value is the high output value from stage 1, every fourth output value is the high output value from stage 2, every eighth output value is the high output value from stage 3, . . . , and every $2^n$ output value is the high output value from stage n. Thus, with proper scheduling a processing unit operating at the input signal rate has enough time to process all the stages.

Circuit arrangement 150, which is also referred to herein as a "computation engine", includes banks of shift registers RB0–RB(s–1), multiplexer 152, analysis processing unit (APU) 156, and control unit (CU) 154. The register banks may also include pre-adds if a symmetric wavelet kernel is implemented. APU 156 performs the decimating FIR function for high and low-pass filtering in accordance with known techniques. Control unit 154 controls the multiplexer 152 selection and clock enables to the respective shift registers. In one embodiment, the functional units of arrangement 150 are implemented using the configurable resources of an FPGA.

A stream of input samples are input to arrangement 150 and designated as X(n). There are s register banks designated RB0–RB(s–1), where s is the number of stages in the DWT. Within each register bank there are k registers (FIG. 3), one register for each tap in the filters that implement the DWT. Thus, each of the register banks has k tap values that are output and available for selection by multiplexer 152. Control unit 154 controls the selection of tap values. Processing unit 156 is configured to perform multiplication of input values by pre-programmed constant coefficients and sum the results in accordance with known DWT techniques.

Output values from processing unit 156 are fed back and selectively input to register banks RB1–RB(s–1). Control unit 154 controls when a register bank is enabled to receive a feedback value via line 157. For the DWT, it will be appreciated that the low-pass value from stage 0 (processed by processing unit 156 from RB0) will be fed back to register bank RB1 for high and low-pass processing in the second stage. Similarly, the low-pass value from stage 1 (processed by processing unit 156 from RB1) will be fed back to register bank RB2 for high and low-pass processing in the third stage.

Address line 158 from control unit indicates the appearance of value output values X(w). Since some values output from processing unit 156 are intermediate and fed back to a subsequent stage, control unit 154 indicates when a valid output value is present and for which stage.

In another embodiment of the invention, circuit arrangement 150 can be adapted to implement the inverse DWT. Instead of analysis processing unit, 156, a synthesis processing unit is used. The function of the SPU is to perform the interpolating FIR function for high and low-pass filtering. The shift registers may include pre-adds if a symmetric wavelet kernel is implemented. Control unit 154 is adapted to control the mux selection and clock enables to the respective shift registers for the sequencing of input values to the inverse DWT. As with the forward DWT structure, the inverse DWT structure employs a single computation engine.

Figure 3:
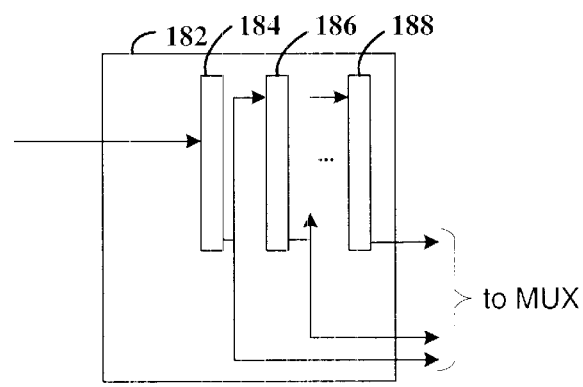
FIG. 3 illustrates one embodiment of a register bank.

FIG. 3 illustrates one embodiment of a register bank. Register bank 182 includes a selected number of shift registers 184, 186, and 188 that can be implemented, for example, using function generators of an FPGA as described by Bauer in U.S. Pat. No. 5,889,413, which is hereby incorporated by reference. The output ports of shift registers 184, 186, and 188 are tapped to provide the output values from the register bank. It will be appreciated that the number of shift registers (or "tapped delays") is dependent on the chosen length of the wavelet filter. Since the type of wavelet will vary for different applications, and the filter length varies by type of wavelet, the length will vary depending on the application.

Figure 4A:
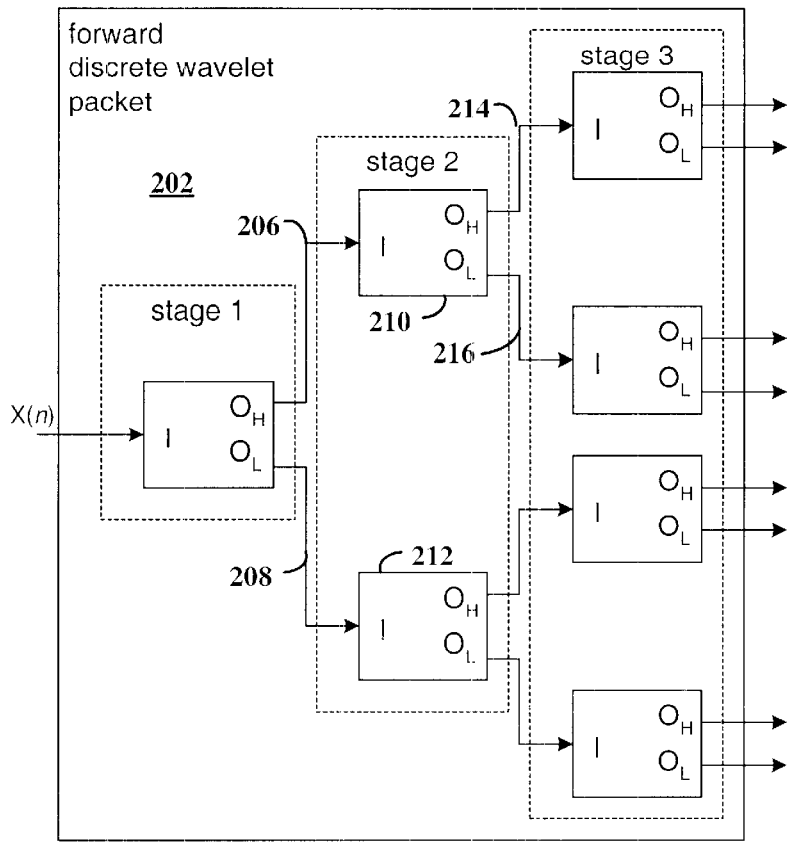
FIG. 4A is a functional block diagram of a forward discrete wavelet packet (DWP) arrangement.

FIG. 4A is a functional block diagram of a forward DWP arrangement 202. In a forward DWP arrangement, the wavelet transform has a tree structure where both the low and the high-pass components are split in each level of the tree. This results in a uniform division of the frequency domain.

Forward DWP arrangement 202 is an example that includes three stages. Each of the stages represents a level in the tree structure. The input sample values are designated as X(n). Output values from the filter element in stage 1 are referred to as $X_{high}(w)$ on line 206 and $X_{low}(w)$ on line 208. $X_{high}(w)$ refers to the high-pass filter output value, and $X_{low}(w)$ refers to the low-pass filter output value. Stage 2 includes filter elements 210 and 212, element 210 receiving the $X_{high}(w)$ from stage 1 and element 212 receiving $X_{low}(w)$ from stage 1. The output values from filter element 210 are referred to as $X_{high-high}(w)$ on line 214 and $X_{high-low}(w)$ on line 216. Similarly, the output values from filter element 212 are referred to as $X_{low-high}(w)$ and $X_{low-low}(w)$. The notation $X_{high-high}(w)$ refers to the output value resulting from an input sample value having been high-pass filtered in stage 1, and the high-pass filtered output value from stage 1 again high-pass filtered in stage 2.

Figure 4B:
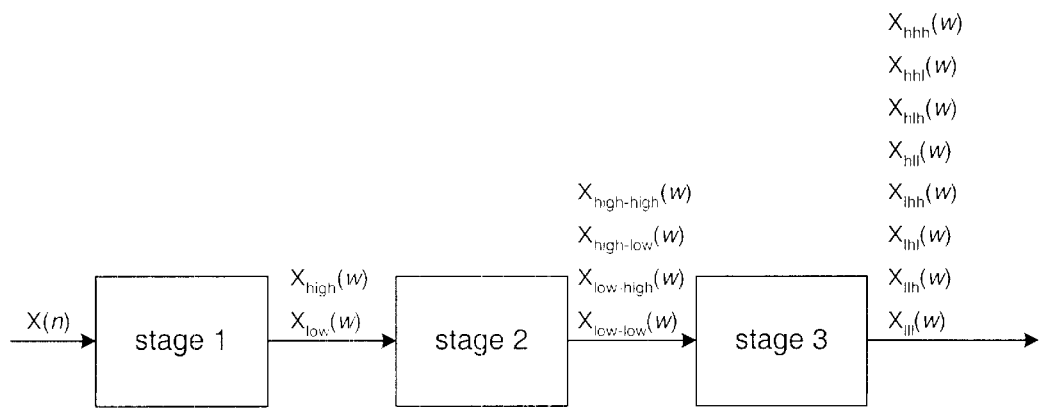
FIG. 4B illustrates a forward DWP arrangement implemented in accordance with one embodiment of the invention.

FIG. 4B illustrates a forward DWP arrangement implemented in accordance with one embodiment of the invention. The output values from one stage to another are serialized. For the $n^{th}$ level of a forward DWP, the output data stream can be represented by having every other output from stage 1, every fourth output from stage 2, every eight output from stage 3, . . . , and every $2^n$ output from stage n. The frequency at which sample values are input and output at each stage is a constant. While only three stages are illustrated, it will be appreciated that the number of stages is dependent on the particular application.

Each of the stages of the forward DWP arrangement 202 can be implemented with a single computation engine because of the fixed bandwidth requirements generated in the uniform frequency division of the forward DWP. Each stage requires more computations than the previous stage. However, the speed at which the computations need to be performed is ½ as fast for each successive stage. That is, for stages numbered 1–n where the first stage computes at a given rate, the second stage computes at ½ the rate of the first stage, the third stage computes at ½ the rate of the second stage, the fourth stage computes at ½ the rate of the third stage, . . . , and the nth stage computes at ½ the rate of the (n−1) stage.

Figure 5:
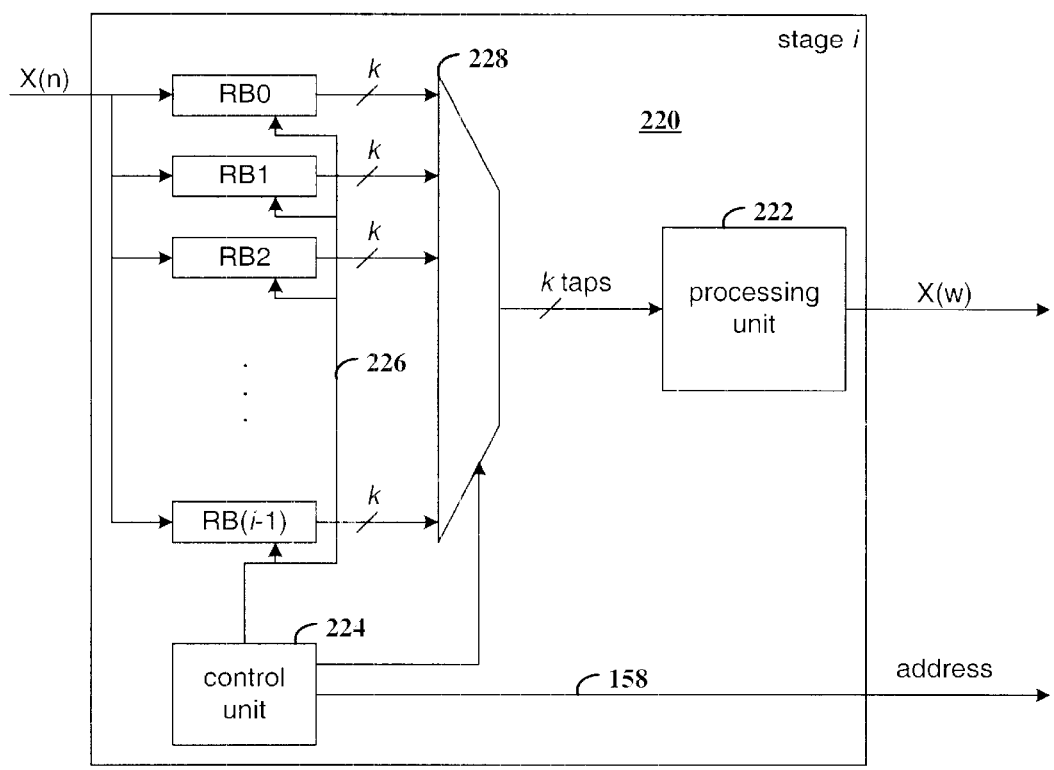
FIG. 5 is a block diagram of a circuit arrangement 220 for implementing a stage i of a forward DWP in accordance with one embodiment of the invention.

FIG. 5 is a block diagram of a circuit arrangement 220 (also "computation engine") for implementing a stage i of a forward DWP in accordance with one embodiment of the invention. In implementing a stage of a forward DWP, processing unit 222 is configured to implement the low-pass and high-pass filter calculations for the filter elements. For example, processing unit 222 is configured to implement the low-pass and high-pass filtering of filter elements 210 and 212 in stage 2 of DWP arrangement 202 (FIG. 4A).

Input values are input in parallel to register banks RB0–RB(i−1). Control unit 224 is configured to enable the first registers in the banks via line 226 and to control the selection of values from register banks RB0–RB(s−1) for input to processing unit 222 via multiplexer 228. The number of register banks in stage n is equal to $2^{n-1}$. For example, in stage 2 there are two register banks, and in stage 3 there are 4 register banks.

Control unit 224 enables the register banks to receive input samples at the proper times. That is, the serially input sample values are directed to the proper register banks.

Figure 6:
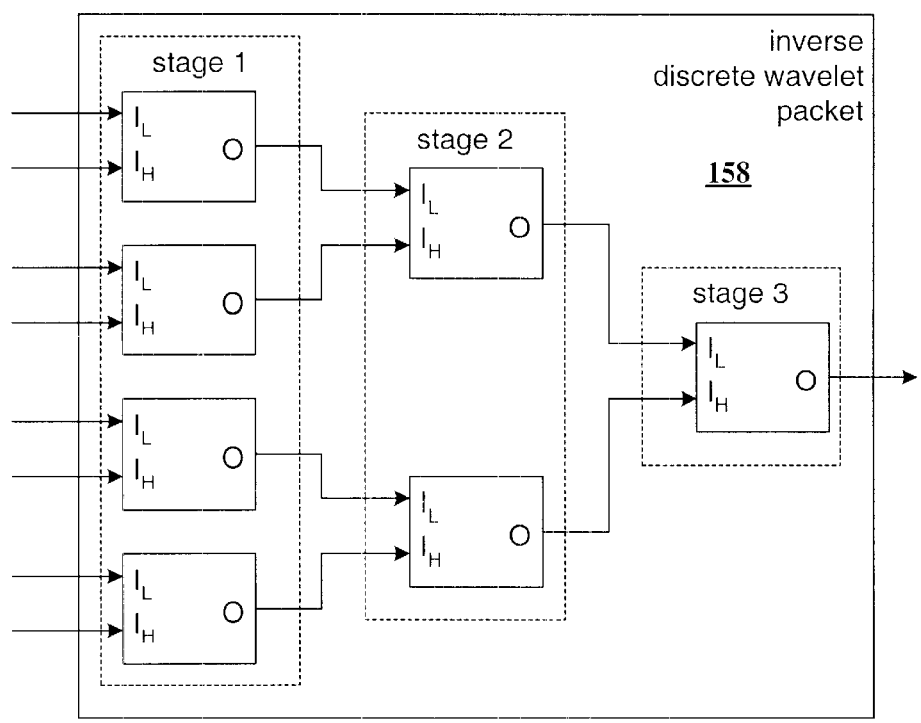
FIG. 6 is a functional block diagram of an example inverse DWP arrangement.

FIG. 6 is a functional block diagram of an example inverse DWP arrangement 242. Each level of the tree is designated as a stage, as with the forward DWP arrangement 202 of FIG. 4A. Each stage of the inverse DWP can be implemented with a single computation engine. Thus, circuit arrangement 220 of FIG. 5 can be modified to implement a stage of the inverse DWP arrangement 242.

To implement a stage of the DWP, processing unit 222 is configured to perform the interpolating FIR function for high and low-pass filtering. The register banks may include pre-adds if a symmetric wavelet kernel is implemented. Control unit 224 is adapted to control the mux selection and clock enables to the respective shift registers for the sequencing of input values to the processing unit 222.

Figure 7A:
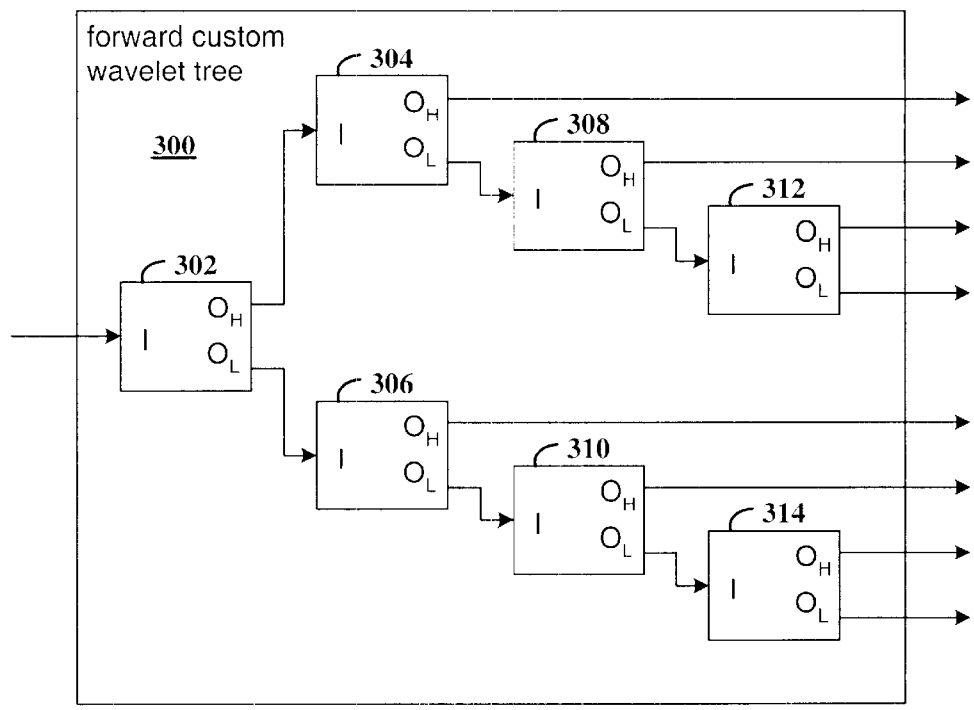
FIG. 7A is a functional block diagram of an example custom wavelet tree (CWT) arrangement.
Figure 8A:
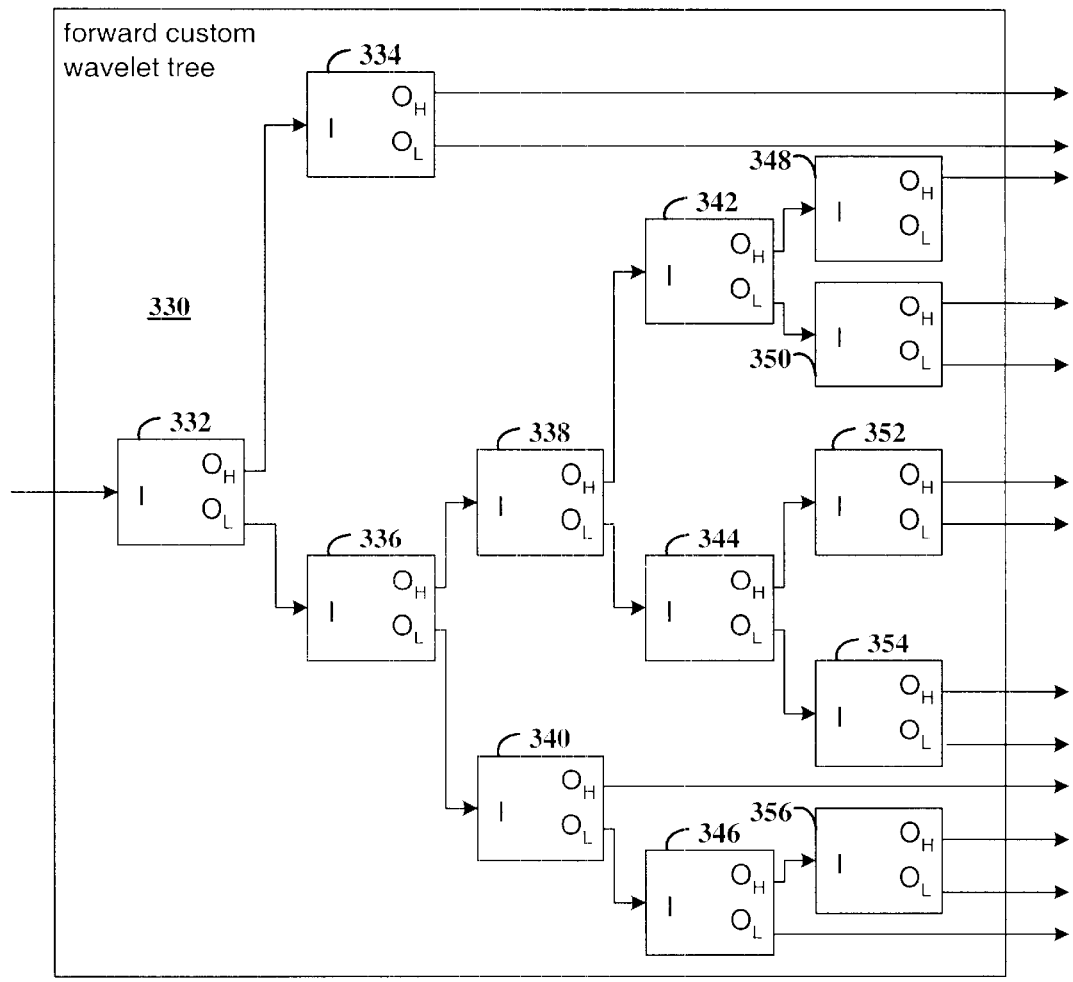
FIG. 8A is a functional block diagram of an example five stage custom wavelet tree (CWT) arrangement.

FIG. 7A is a functional block diagram of an example custom wavelet tree (CWT) arrangement 300. The stages in a custom wavelet tree are adapted according to the needs of the application. In a CWT arrangement, some stages may be similar in structure while others may be different. Thus, there are countless CWT structures. FIG. 7A illustrates one example CWT arrangement, and FIG. 8A illustrates another example CWT arrangement.

CWT arrangement 300 is an example that includes four stages. Stage 1 includes filter element 302, stage 2 includes filter elements 304 and 306, stage 3 includes filter elements 308 and 310, and stage 4 include filter elements 312 and 314. In each of stages 2 and 3, the high pass output data are provided as output values, and the low pass output data are input to the following stage.

The number of processing units associated with a wavelet structure is determined by the bandwidth considerations. For example, as shown in the previous figures a DWT arrangement can be implemented using a single processor engine, whereas a DWP arrangement requires one processor per stage. A cost basis bandwidth model can be used to restructure a CWT to reduce the number of processing units required to implement the multiple stages.

The cost basis bandwidth model attaches a weight that is greater than 0 and less than or equal to 1 to each filter element in the wavelet structure. The weight indicates the quantity of resources of a computation engine that is required by the filter element per input sample. For example, a weight of 1 means that a filter element requires all the computational resources of a computation engine for an input sample, and a weight of 0.5 means that a filter element requires ½ the computational resources of a computation engine for an input sample.

The filter elements in a CWT structure can be mapped to one or more computation engines by determining the weights of the filter elements, determining which filter elements can share a computation engine, and assigning the filter elements to computation engines. For example, filter element 302 has a weight=1, filter elements 304 and 306 have weights=0.5, filter elements 308 and 310 have weights=0.25, and filter elements 312 and 314 have weights=0.125. Thus, filter element 302 requires a dedicated computation engine, and filter elements 304, 306, 308, 310, 312, and 314 can be mapped to two additional computation engines.

In one example, mapping, filter elements 304, 308, and 312 are mapped to one computation engine, and filter elements 306, 310, and 314 are mapped to another computation engine. For filter elements 304, 308, and 312, the total weight=(0.5+0.25+0.125)=0.875. Similarly, for filter elements 306, 310, and 314, the total weight=(0.5+0.25+0.125)=0.875.

Figure 7B:
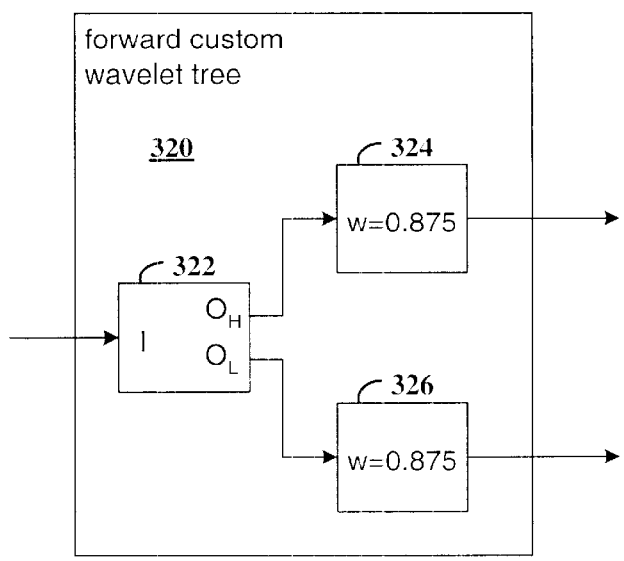
FIG. 7B is a functional block diagram of a forward CWT arrangement resulting from cost basis mapping of the forward CWT arrangement of FIG. 7A.

FIG. 7B is a functional block diagram of a forward CWT arrangement 320 resulting from cost basis mapping of the filter elements of forward CWT arrangement 300 of FIG. 7A. Filter element 302 is mapped to computation engine 322; filter elements 304, 308, and 312 are mapped to computation engine 324; and filter elements 306, 310, and 314 are mapped to computation engine 326.

In one embodiment, computation engine 322 is implemented as a single stage DWT in accordance with the teachings of forward DWT arrangement 150 of FIG. 2. Thus, computation engine 322 includes a single register bank since only one stage is implemented. The serial output values from the processing unit 156 are demultiplexed and provided as input values to computation engines 324 and 326.

Computation engine 324 is implemented as a three-stage DWT structure in accordance with the teachings of FIG. 2. Thus, computation engine 324 includes 3 register banks. Similarly, computation engine 326 includes 3 register banks, one for each stage.

It will be appreciated that an inverse CWT arrangement can be constructed by reversing the order of the computation engines and adapting the control units and processing units accordingly.

FIG. 8A is a functional block diagram of an example five stage custom wavelet tree (CWT) arrangement 330. CWT arrangement 330 includes filter elements 332, 334, 336, 338, 340, 342, 344, 346, 348, 350, 352, 354, and 356, connected as shown. Using the cost basis model described above, the filter elements can be mapped to computation engines as follows.

First the weights of the filter elements are determined. In stage 1, filter element 332 has weight=1; in stage 2, filter elements 334 and 336 have weights=0.5; in stage 3, filter elements 338 and 340 have weights=0.25; in stage 4, filter elements 342, 344, and 346 have weights=0.125; and in stage 5, filter elements 348, 350, 352, 3534, and 356 have weights=0.0625.

The factors that are considered in grouping the filter elements include the respective weights and the positional relationships in the wavelet tree. To combine a set of filter elements into a group, the total of the weights of the filter elements must be less than or equal to 1.0. When the filter elements in a group are implemented with a processor and a control unit as described above, the control unit is configured to sequence the data to the processing unit consistent with the position of the filter elements in the wavelet tree.

Figure 8B:
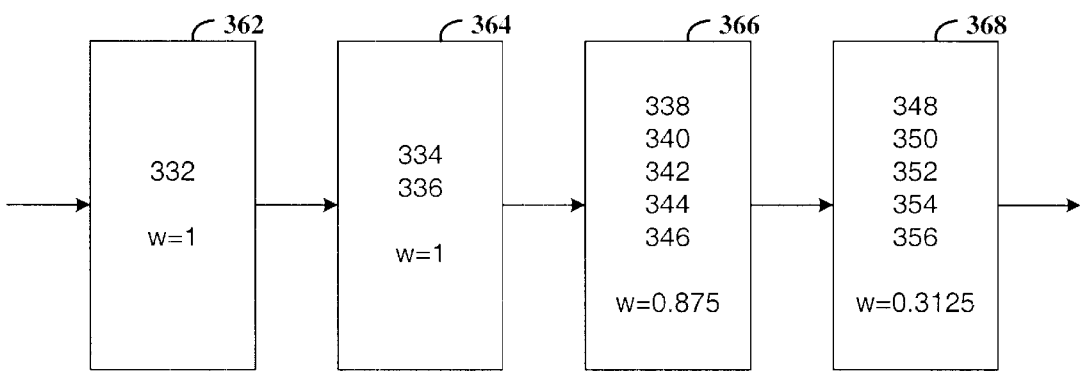
FIG. 8B illustrates the mapping of the CWT arrangement of FIG. 8A to computation engines.

FIG. 8B illustrates the mapping of CWT arrangement 330 of FIG. 8A to computation engines. Filter element 332 is assigned to computation engine 362 since it has weight=1. Filter elements 334 and 336 have a combined weight=1 and are assigned to computation engine 364; filter elements 338, 340, 342, 344, and 346 have a combined weight=0.875 and are assigned to computation engine 366; and filter elements 348, 350, 352, 354, and 356 have a combined weight= 0.3125 and are assigned to computation engine 368. Computation engines 362, 364, 366, and 368 are implemented in accordance with the teachings of FIG. 5 for a forward DWP arrangement, since a computation engine is used for each stage.

The present invention is believed to be applicable to a variety of wavelet systems and is believed to be particularly applicable and beneficial in wavelet systems implemented on FGPAs. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computation engine for forward transform in a wavelet system characterized by a plurality of filter elements that are coupled to form a plurality of stages, comprising:
   a plurality of register banks having input ports arranged to receive input sample values;
   a multiplexer coupled to the output ports of the register banks;
   a processing unit having an input port coupled to the multiplexer and an output port coupled to the input ports of the register banks, the processing unit configured and arranged to high-pass filter and low-pass filter input values and decimate filtered high-pass values and low-pass values; and
   a control unit coupled to the register banks and multiplexer, the control unit configured and arranged to select output values from the register banks via the multiplexer and selectively enable storage of input values in the register banks in a sequence that implements one or more filter elements of one or more stages of the forward transform.

2. The computation engine of claim 1, wherein the register banks, multiplexer, processing unit, and control unit are implemented on an FPGA.

3. The computation engine of claim 1, wherein each register bank comprises a plurality of shift registers coupled in a chain, each shift register including an output tap for the associated register bank.

4. The computation engine of claim 3, wherein a first one of the register banks is arranged to receive input sample values and others of the plurality of register banks include a first register having an input port coupled to the output port of the processing unit, and the control unit is further configured and arranged to selectively enable the others of the register banks to receive feedback values from the processing unit and to address valid output values from the processor to implement filter elements in a plurality of stages of the forward transform.

5. The computation engine of claim 3, wherein a first register in each of the register banks is coupled to an input line, and the control unit is further configured and arranged to selectively enable the plurality of register banks to receive input values via the input line and to address valid output values from the processor to implement a plurality of filter elements in a one stage of the forward transform.

6. A computation engine for inverse transform in a wavelet system characterized by a plurality of filter elements that are coupled to form a plurality of stages, comprising:
   a plurality of register banks having input ports arranged to receive input sample values;
   a multiplexer coupled to the output ports of the register banks;
   a processing unit having an input port coupled to the multiplexer and an output port coupled to the input ports of the register banks, the processing unit configured and arranged to high-pass filter and low-pass filter input values, interpolate filtered high-pass values and low-pass values, and sum interpolated values; and
   a control unit coupled to the register banks and multiplexer, the control unit configured and arranged to select output values from the register banks via the multiplexer and selectively enable storage of input values in ones of the register banks in a sequence that implements one or more filter elements of one or more stages of the inverse transform.

7. The computation engine of claim 6, wherein the register banks, multiplexer, processing unit, and control unit are implemented on an FPGA.

8. The computation engine of claim 6, wherein each register bank comprises a plurality of shift registers coupled in a chain, each shift register including an output tap for the associated register bank.

9. The computation engine of claim 8, wherein a first one of the register banks is arranged to receive input sample values and others of the plurality of register banks include a first register having an input port coupled to the output port of the processing unit, and the control unit is further configured and arranged to selectively enable the others of the register banks to receive feedback values from the processing unit and to address valid output values from the processor to implement filter elements in a plurality of stages of the inverse transform.

10. The computation engine of claim 8, wherein a first register in each of the register banks is coupled to an input line, and the control unit is further configured and arranged to selectively enable the plurality of register banks to receive input values via the input line and to address valid output values from the processor to implement a plurality of filter elements in a one stage of the inverse transform.

11. A circuit arrangement for computing an n-stage one-dimensional forward discrete wavelet transform (DWT), comprising:
   n register banks, a first one of the register banks having an input port arranged to receive input sample values, and others of the register banks having respective input ports arranged to receive feedback values;

a multiplexer coupled to the output ports of the register banks;

a processing unit having an input port coupled to the multiplexer and an output port coupled to the input ports of the others of the register banks, the processing unit configured and arranged to high-pass filter and low-pass filter input values and decimate filtered high-pass values and low-pass values for the n-stages of the DWT; and a control unit coupled to the register banks and multiplexer, the control unit configured and arranged to select output values from the register banks via the multiplexer and selectively enable the others of the register banks to receive feedback values from the processing unit in a sequence that implements the n-stages of the forward DWT.

12. The circuit arrangement of claim 11, wherein the register banks, multiplexer, processing unit, and control unit are implemented on an FPGA.

13. The circuit arrangement of claim 11, wherein each register bank comprises a plurality of shift registers coupled in a chain, each shift register including an output tap for the associated register bank.

14. A circuit arrangement for computing an n-stage one-dimensional inverse discrete wavelet transform (DWT), comprising:

n register banks, a first one of the register banks having an input port arranged to receive input sample values, and others of the register banks having respective input ports arranged to receive feedback values;

a multiplexer coupled to the output ports of the register banks;

a processing unit having an input port coupled to the multiplexer and an output port coupled to the input ports of the others of the register banks, the processing unit configured and arranged to high-pass filter and low-pass filter input values, interpolate filtered high-pass values and low-pass values, and sum interpolated values for the n-stages of the DWT; and a control unit coupled to the register banks and multiplexer, the control unit configured and arranged to select output values from the register banks via the multiplexer and selectively enable the others of the register banks to receive feedback values from the processing unit, and address valid output values from the processor in a sequence that implements the n-stages of the inverse DWT.

15. The circuit arrangement of claim 14, wherein the register banks, multiplexer, processing unit, and control unit are implemented on an FPGA.

16. The circuit arrangement of claim 14, wherein each register bank comprises a plurality of shift registers coupled in a chain, each shift register including an output tap for the associated register bank.

17. A circuit arrangement for implementing stage n in a one-dimensional forward discrete wavelet packet (DWP), comprising:

n register banks, wherein a first register in each of the register banks is coupled to an input line;

a multiplexer coupled to the output ports of the register banks;

a processing unit having an input port coupled to the multiplexer and an output port coupled to the input ports of the others of the register banks, the processing unit configured and arranged to high-pass filter and low-pass filter input values and decimate filtered high-pass values and low-pass values for the $n^{th}$ stage of the DWP; and a control unit coupled to the register banks and multiplexer, the control unit configured and arranged to select output values from the register banks via the multiplexer, selectively enable the plurality of register banks to receive input values via the input line, and address valid output values from the processor in a sequence that implements the $n^{th}$ stage of the forward DWP.

18. The circuit arrangement of claim 17, wherein the register banks, multiplexer, processing unit, and control unit are implemented on an FPGA.

19. The circuit arrangement of claim 17, wherein each register bank comprises a plurality of shift registers coupled in a chain, each shift register including an output tap for the associated register bank.

20. A circuit arrangement for implementing stage n in a one-dimensional inverse discrete wavelet packet (DWP), comprising:

n register banks, wherein a first register in each of the register banks is coupled to an input line;

a multiplexer coupled to the output ports of the register banks;

a processing unit having an input port coupled to the multiplexer and an output port coupled to the input ports of the others of the register banks, the processing unit configured and arranged to high-pass filter and low-pass filter input values, interpolate filtered high-pass values and low-pass values, and sum interpolated values; and a control unit coupled to the register banks and multiplexer, the control unit configured and arranged to select output values from the register banks via the multiplexer, selectively enable the plurality of register banks to receive input values via the input line, and address valid output values from the processor in a sequence that implements the $n^{th}$ stage of the forward DWP.

21. The circuit arrangement of claim 20, wherein the register banks, multiplexer, processing unit, and control unit are implemented on an FPGA.

22. The circuit arrangement of claim 20, wherein each register bank comprises a plurality of shift registers coupled in a chain, each shift register including an output tap for the associated register bank.

23. A method for implementing a forward transform wavelet system with a plurality of computation engines, the wavelet system characterized by a plurality of filter elements that are coupled to form s stages, the stages numbered 0 through (s−1), the method comprising:

computing weights for the filter elements, wherein the weight of a filter element is equal to $\frac{1}{2}^n$, where n is the stage in which the filter element is disposed;

grouping the filter elements into sets, each set including one or more filter elements having weights that total less than or equal to 1;

for each set, implementing the filter elements with a computation engine, each computation engine configured and arranged to sequence input data consistent with the filter elements in the set, high-pass filter and low-pass filter input values, and decimate filtered high-pass values and low-pass values; and coupling the computation engines one to another consistent with characteristics of the wavelet system.

24. A method for implementing an inverse transform wavelet system with a plurality of computation engines, the wavelet system characterized by a plurality of filter elements that are coupled to form s stages, the stages numbered 0 through (s−1), the method comprising:

computing weights for the filter elements, wherein the weight of a filter element is equal to $½^n$, where n is the stage in which the filter element is disposed;

grouping the filter elements into sets, each set including one or more filter elements having weights that total less than or equal to 1;

for each set, implementing the filter elements with a computation engine, each computation engine configured and arranged to sequence input data consistent with the filter elements in the set, high-pass filter and low-pass filter input values, interpolate filtered high-pass values and low-pass values, and sum interpolated values; and coupling the computation engines one to another consistent with characteristics of the wavelet system.

* * * * *